Patented Nov. 15, 1932

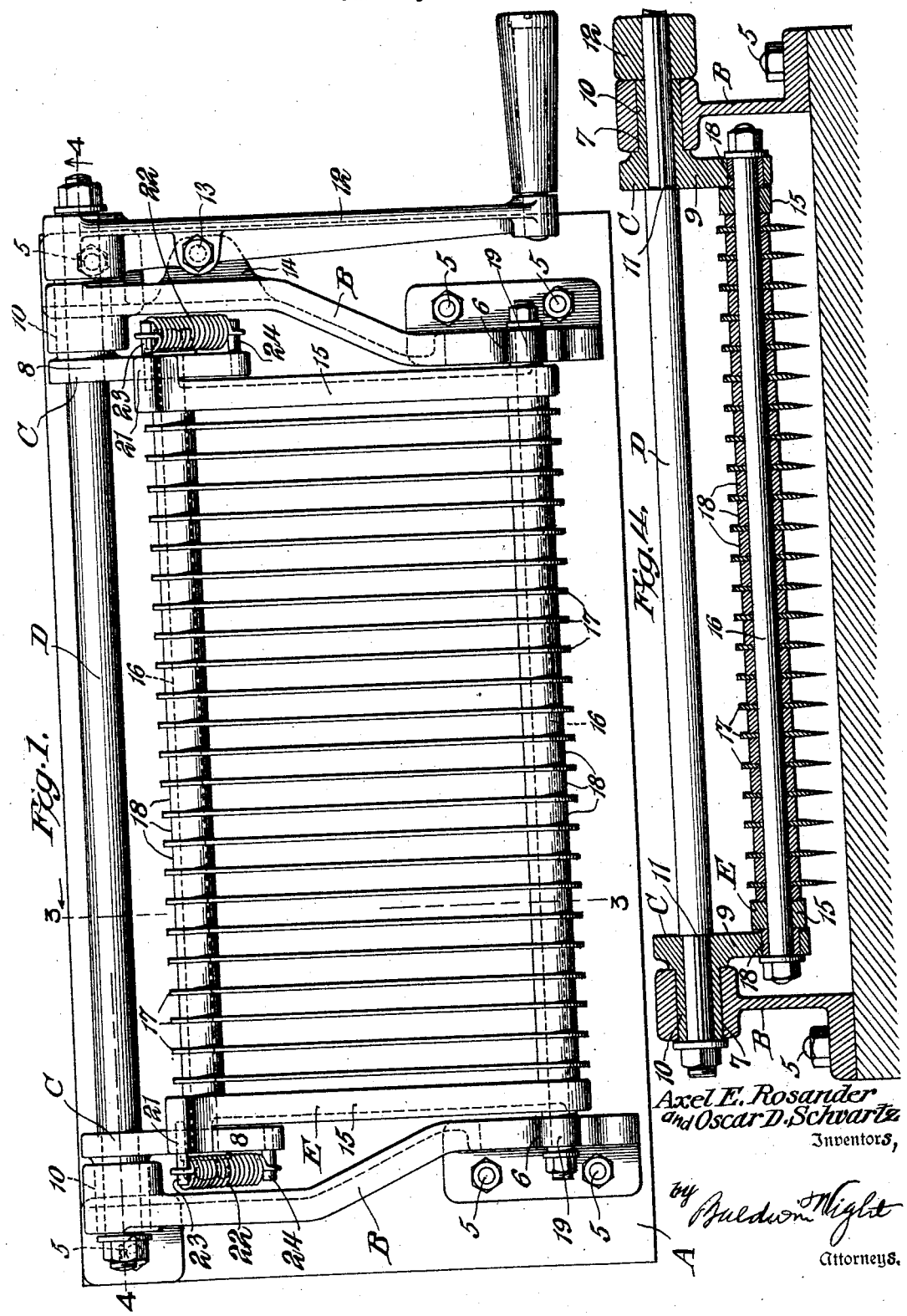

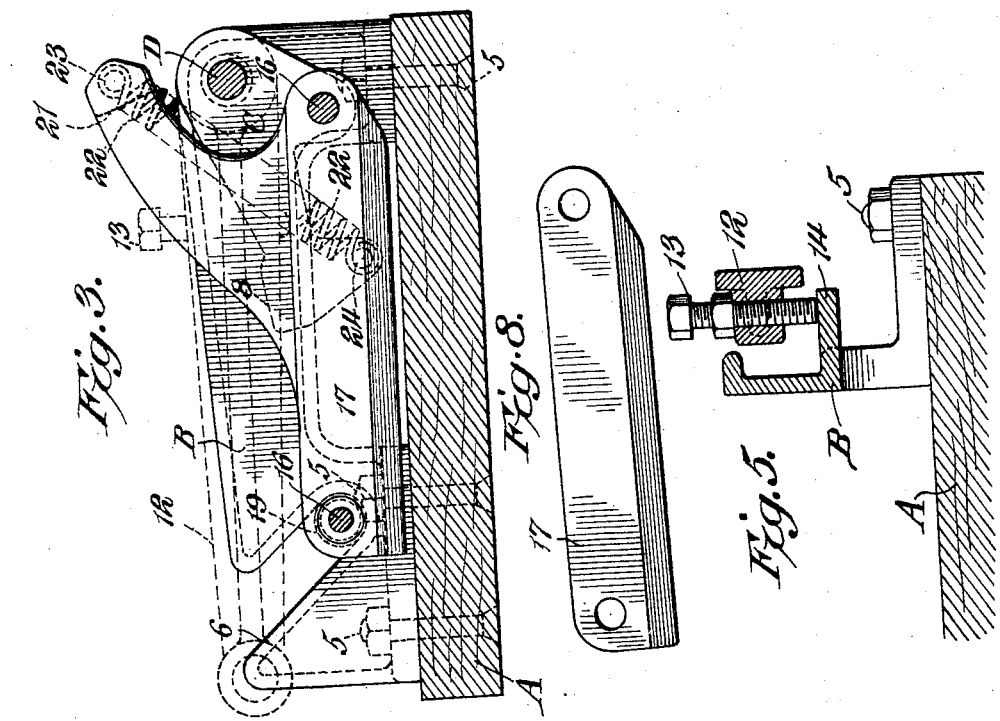
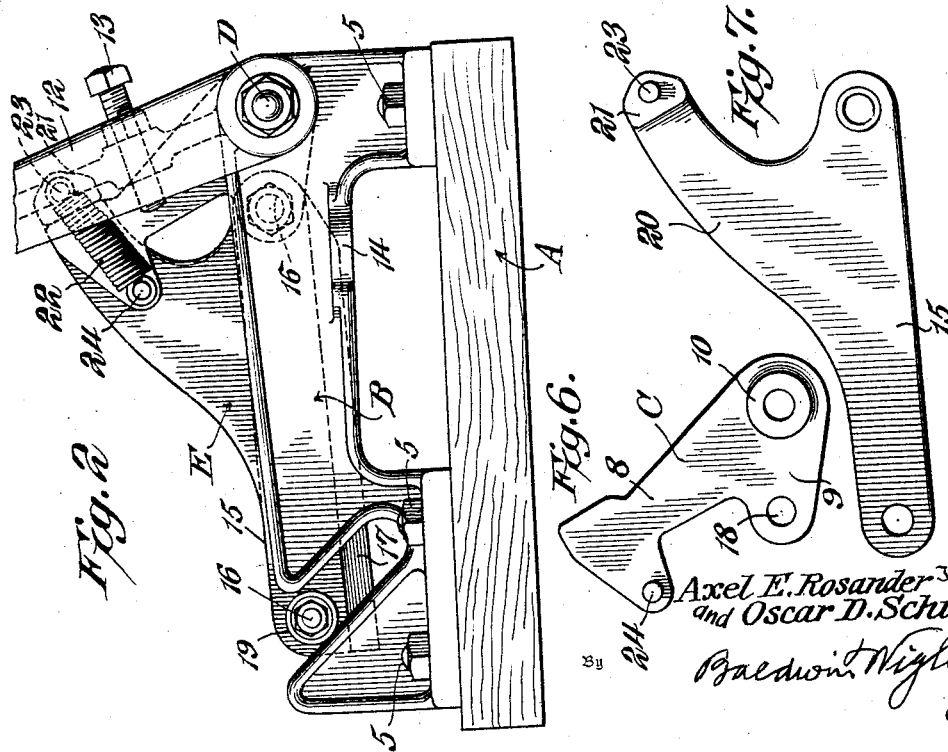

1,887,892

UNITED STATES PATENT OFFICE

AXEL E. ROSANDER AND OSCAR D. SCHVARTZ, OF CINCINNATI, OHIO

MEAT TENDERER

Application filed April 11, 1931. Serial No. 529,512.

Among the several objects of the invention are to provide a meat tenderer of a construction by means of which a steak may be readily cut through or nearly through by a plurality of knives disposed in parallelism, whereby the heat from the cooking stove may readily contact the interior of the meat and thereby thoroughly cook the same; and to provide a meat tenderer which is composed of comparatively few parts and which is therefor simple in construction and cheap to manufacture.

With these and other objects in view which will more fully appear, the nature of the invention will be more clearly understood by following the description, the appended claims, and the several views illustrated in the accompanying drawings.

In the drawings:

Figure 1 is a top plan view of a meat tenderer constructed in accordance with our invention.

Figure 2 is a side elevation thereof.

Figure 3 is a vertical longitudinal sectional view taken on the line 3—3 of Figure 1.

Figure 4 is a vertical cross sectional view thereof taken on the line 4—4 of Figure 1.

Figure 5 is a detail vertical sectional view showing the adjustable limiting stop for the handle.

Figure 6 is a view in elevation of one of the bell crank levers.

Figure 7 is a similar view of one of the side bars of the knife carrying frame, and Figure 8 is a similar view of one of the knives.

Like reference numerals designate corresponding parts throughout the several figures of the drawings.

Referring to the drawings, our invention includes a flat base or support A for the meat or other work to be cut, and fixedly secured to the upper face thereof by bolts 5 or other fastening means, are spaced standards B, B which extend fore and aft of the base. The standards adjacent their forward ends are provided with transversely alined cam slots 6, 6 which extend downwardly and rearwardly. The standards adjacent their rear ends are formed with transversely alined bearings 7, 7.

A pair of bell-crank levers C, C are disposed between the standards, and each lever comprises a substantially vertical or upwardly extending arm 8, a substantially horizontal or forwardly extending arm 9, and a hub 10 which is located intermediate said arms and is journaled in the bearing 7 of the adjacent standard B.

An operating shaft D has its ends respectively disposed within and rigidly secured to the hubs 10 of the levers C by keys 11 or other means whereby oscillation of the shaft will rock the levers in unison. One end of the shaft projects beyond the adjacent standard B and fixed thereon is a crank handle 12. The handle is provided thereon is a crank handle 12. The handle is provided with an adjustable stop screw 13 which is adapted to engage a lug 14 on the adjacent standard B and thereby limit the forward downward movement of the handle.

A knife-carrying frame E comprises side bars 15, 15 which are disposed between the standards B, B, and which are connected adjacent their ends by transverse front and rear rods 16, 16, thus forming a rectangular frame. A plurality of knives 17 which are disposed in parallelism between the side bars 15, 15, are mounted at their front and rear ends on the rods 16, 16, and are maintained in spaced parallel relation by collars 18 mounted on said rods. The ends of the rear rod 16 project beyond the side bars 15 and are journaled in bearing openings 18, 18 formed in the horizontal arms 9 of the bell crank levers C. The ends of the front rods 16 also project beyond the side bars, and journaled thereon are cam rollers 19, 19 which are engageable in the cam slots 6 of the standards B.

The side bars 15 of the knife-carrying frame are provided with integral arms 20, 20 which extend upwardly and rearwardly and terminate in laterally extending stop lugs 21, 21, adapted to be engaged by the upper ends of the vertical arms 8 of the bell-crank lever C. A coil spring 22 connects associated arms 8 and 20, the rear end of each spring being connected to a pin 23 fixed to the lug 21 and the front end being connected to a pin 24 fixed to the arm 8, the springs serving to yieldingly pull the forward end of the knife-carrying frame E downwardly upon forward swinging movement of the handle 12, and to automatically raise the forward end of said frame when the handle is swung rearwardly.

In operation, the knife-carrying frame E is swung upwardly and rearwardly by the handle 12, to thereby clear the base A and permit the steak or other meat to be readily placed on the base. The frame E is then swung forwardly and downwardly by the handle 12, and during this movement the rear end of the frame will swing about the arc traversed by the pivotal connection between the rear rod 16 of the frame and the bearing openings 18 of the lever arms 9, the front end of the frame will be pulled downwardly by the lever arms 8 and springs 22, the rear end of the frame will be moved rearwardly by the lever arms 9, and the front end of the frame will be moved downwardly and rearwardly by reason of the rollers 19 engaging the slots 6 of the standards. The downward movement of the frame is adjustably limited by the stop screw 13 whereby the meat may be cut through to a more or less extent as may be desired. The frame is then raised, the meat turned 90 degrees, and the frame again lowered to form resultant cross cuts in the meat.

We claim as our invention:

1. In a meat tenderer, the combination with a base, of a pair of spaced standards secured thereon and having rearwardly and downwardly extending cam slots formed adjacent the forward ends thereof, a knife-carrying frame disposed between the standards and comprising spaced side bars and front and rear transverse rods connecting the bars, the ends of the front rod projecting into the cam slots of the standards, a plurality of cutting knives located between the side bars of the frame and connected to the front and rear rods thereof, an operating shaft disposed in rear of said frame and having its ends journaled in the standards adjacent the rear ends thereof, forwardly extending lever arms fixed to the operating shaft and having pivotal connections with the rear transverse rod of the frame, and an operating handle fixed to one end of the operation shaft.

2. In a meat tenderer, the combination with a base, of a pair of spaced standards secured thereon and having rearwardly and downwardly extending cam slots formed adjacent the forward ends thereof, a knife-carrying frame disposed between the standards and comprising spaced side bars and front and rear transverse rods connecting the bars, the ends of the front rod projecting into the cam slots of the standards, a plurality of cutting knives located between the side bars of the frame and connected to the front and rear rods thereof, an operating shaft disposed in rear of said frame and having its ends journaled in the standards adjacent the rear ends thereof, forwardly extending lever arms fixed to the operating shaft and having pivotal connections with the rear transverse rod of the frame, an upwardly extending lever arm fixed to the operating shaft, a yieldable connection between the upwardly extending lever arm and the adjacent side bar of the knife-carrying frame, and an operating handle fixed to one end of the operating shaft.

3. In a meat tenderer, the combination with a base, of a pair of spaced standards secured thereon and having rearwardly and downwardly extending cam slots formed adjacent the forward ends thereof, a knife-carrying frame disposed between the standards and comprising spaced side bars and front and rear transverse rods connecting the bars, the ends of the front rod projecting into the cam slots of the standards, a plurality of cutting knives located between the side bars of the frame and connected to the front and rear rods thereof, an operating shaft disposed in rear of said frame and having its ends journaled in the standards adjacent the rear ends thereof, forwardly extending lever arms fixed to the operating shaft and having pivotal connections with the rear transverse rod of the frame, an upwardly extending lever arm fixed to the operating shaft, and provided with a laterally extending lug adjacent its upper end, an upwardly and rearwardly extending arm rigidly connected to one of the side bars of the knife-carrying frame and having its upper end normally in contact with said lug, a spring connecting the upwardly extending lever and the upwardly and rearwardly extending arm for normally maintaining the lever in contact with the lug.

4. In a meat tenderer, the combination with a base, of a pair of spaced standards secured thereon and having rearwardly and downwardly extending cam slots formed adjacent the forward ends thereof, a knife-carrying frame disposed between the standards and comprising spaced side bars and front and rear transverse rods connecting the bars, the ends of the front rod projecting into the cam slots of the standards, a plurality of cutting knives located between the side bars of the frame and connected to the front and rear rods thereof, an operating shaft disposed in rear of said frame and having its ends journaled in the standards adjacent the rear ends thereof, forwardly extending lever arms fixed to the operating shaft and having pivotal connections with the rear transverse rod of the frame, an operating handle fixed to one end of the operating shaft, and an adjustable stop screw carried by the handle for cooperation with the adjacent standard to limit the forward and downward movement of the handle.

5. In a meat tenderer, the combination with a flat support, of a pair of spaced standards secured thereto and each provided adjacent the forward end with downwardly and rearwardly extending cam slots, a bell crank lever having an integral hub located intermediate the arms of the lever and journaled in the rear end of each standard, an operating shaft extending through the hubs and having rigid connection therewith, one end of the shaft projecting beyond the adjacent standard, a knife supporting frame comprising a rear transverse rod journaled in the horizontal arms of the bell crank levers, a front transverse rod having its ends projecting into the cam slots of the standards, and spaced side bars connecting the front and rear rods, a plurality of cutting knives located between the side bars of the frame and connected to the front and rear rods thereof, antifriction rollers journaled on the ends of the front rod for engaging the side walls of the cam slots, each side bar of the frame including an upwardly and rearwardly extending arm having a laterally extending lug disposed in rear of the vertical arm of the associated bell crank lever and forming a stop for the rearward movement of said lever, a coil spring connecting each upwardly extending arm and each bell crank lever for yieldably retaining the vertical arm of the bell crank lever in contact with said lugs, an operating handle fixed to the projecting end of the operating shaft, a stop lug disposed below the operating handle and extending laterally from the adjacent standard, and a stop screw threadably engaged in the handle for engaging the stop lug limit the downward and forward movement of the cutting knives.

In testimony whereof, we have hereunto subscribed our names.

AXEL E. ROSANDER.
OSCAR D. SCHVARTZ.